Sept. 7, 1965

C. C. JONES 3,204,358

AUDIO SIGNAL SYSTEM

Filed Feb. 13, 1961

Clayton C. Jones
INVENTOR.

BY A.T. Sperry
ATTORNEY

Sept. 7, 1965  C. C. JONES  3,204,358
AUDIO SIGNAL SYSTEM
Filed Feb. 13, 1961  2 Sheets—Sheet 2
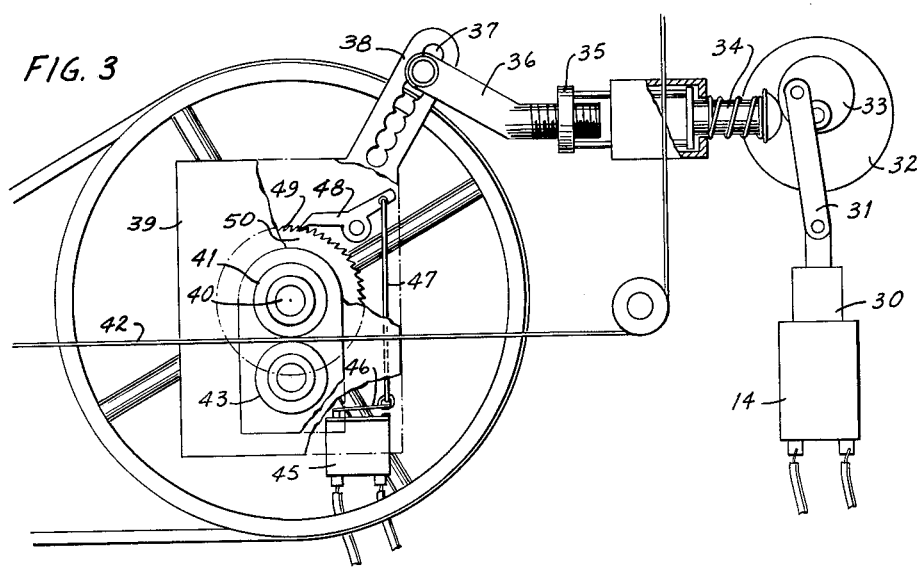
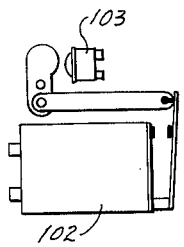
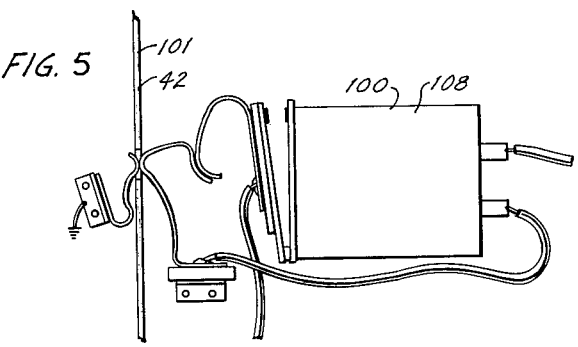
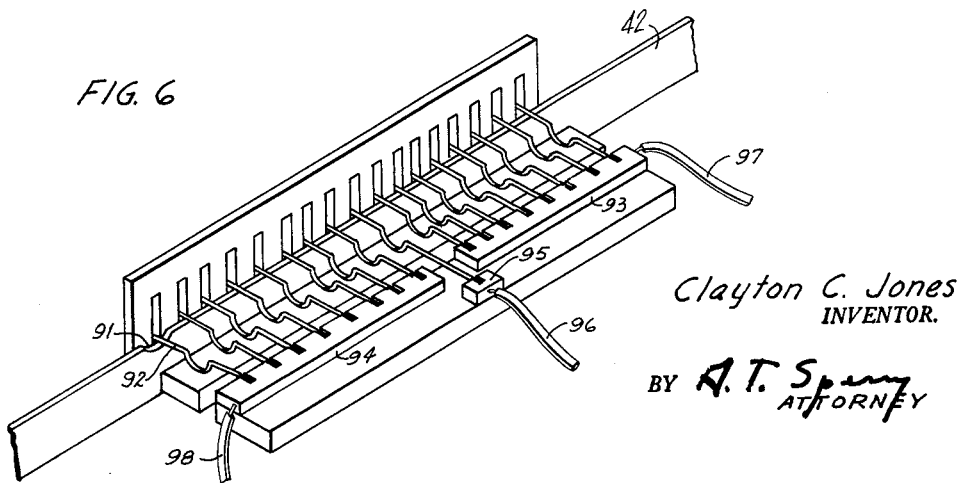
Clayton C. Jones
INVENTOR.
BY A. T. Sperry
ATTORNEY

United States Patent Office 3,204,358
Patented Sept. 7, 1965

3,204,358
AUDIO SIGNAL SYSTEM
Clayton C. Jones, 10409 Ashley St., Tampa, Fla.
Filed Feb. 13, 1961, Ser. No. 89,011
3 Claims. (Cl. 40—42)

This invention relates to travel guides and is particularly concerned with combined printed roadway information, such as a highway map or the like and audible means for supplementing such printed information.

While conventional highway maps are in widespread use and serve admirably for the purpose intended, there is one particularly serious drawback to the use, namely that concentration on the map requires the operator to stop the vehicle for such concentration. This drawback is somewhat mitigated where an occupant other than the operator concentrates on the map while the operator concentrates on driving. Even this, however, has drawbacks in that it is not always easy to accurately instruct the driver even though the non-driving occupant is concentrating on the map, and of course, such operation is not available when the operator is the lone occupant in the car. Further, much information is desirable which is not readily available from a road map in view of the small print and the necessity for maps of complicated design and crowded characters.

It is therefore one of the primary objects of the present invention to provide in combination with a road map or equivalent printed instructions, audible means for informing the car occupants of directions, road conditions, or places of historic interest. The audible device may also be used in a highly advantageous commercial manner by calling the driver's attention to restaurants, resort places, and like establishments, for food and beverages, as well as for amusement. It is also an important object of the present invention to provide synchronizing means for movement of a tape type road map and a recorded audio information device, so that the audio information will be available to the car occupants as the places referred to come into view or are readily accessible from the position of the car at the time the audible signal is emitted. A further important object of the invention is to provide means for ready adjustment of the synchronization between the printed information and the audible signal. It would be obvious that in a case of detours and excursions from the main highway, that the audio signal will not be in synchronation with the printed material, and hence the arrangement seeks to provide a readily adjustable means for repeated resynchronization to either advance or retard the operation of the audio signal. Numerous features, objects and advantages of the invention other than the above, include that of providing novel though simple mechanical mechanisms for carrying out the objects, will be apparent from a consideration of the following specification taken in conjunction with the accompanying drawings, in which:

FIG. 1 is a schematic illustration showing a preferred electrical diagram for the device, as well as schematically illustrating some of the mechanical mechanisms, FIG. 2 is a detailed section showing the step by step feed mechanism for the map tape, FIG. 3 is a detailed view showing the primary map tape drive mechanism, FIG. 4 is a schematic illustration of one form of relay used in connection with the present invention.

FIG. 5 is a more detailed view of the relay mechanism, and

FIG. 6 is a perspective view of the control mechanism for maintaining synchronization of the tape.

While the invention is here discussed in term of a strip road map and synchronized audio signal or information mechanism, it will be understood that the inventive concept is in no way limited to this application. Without undue modification or change the principles of the invention are applicable to air or sea transportation. Further, while the audio recorded tape is herein contemplated as for information by the spoken word, sections of the tape or all of it, if so desired, may bear recorded musical selections or other recordings not necessarily related to vehicle travel.

Figure 1:
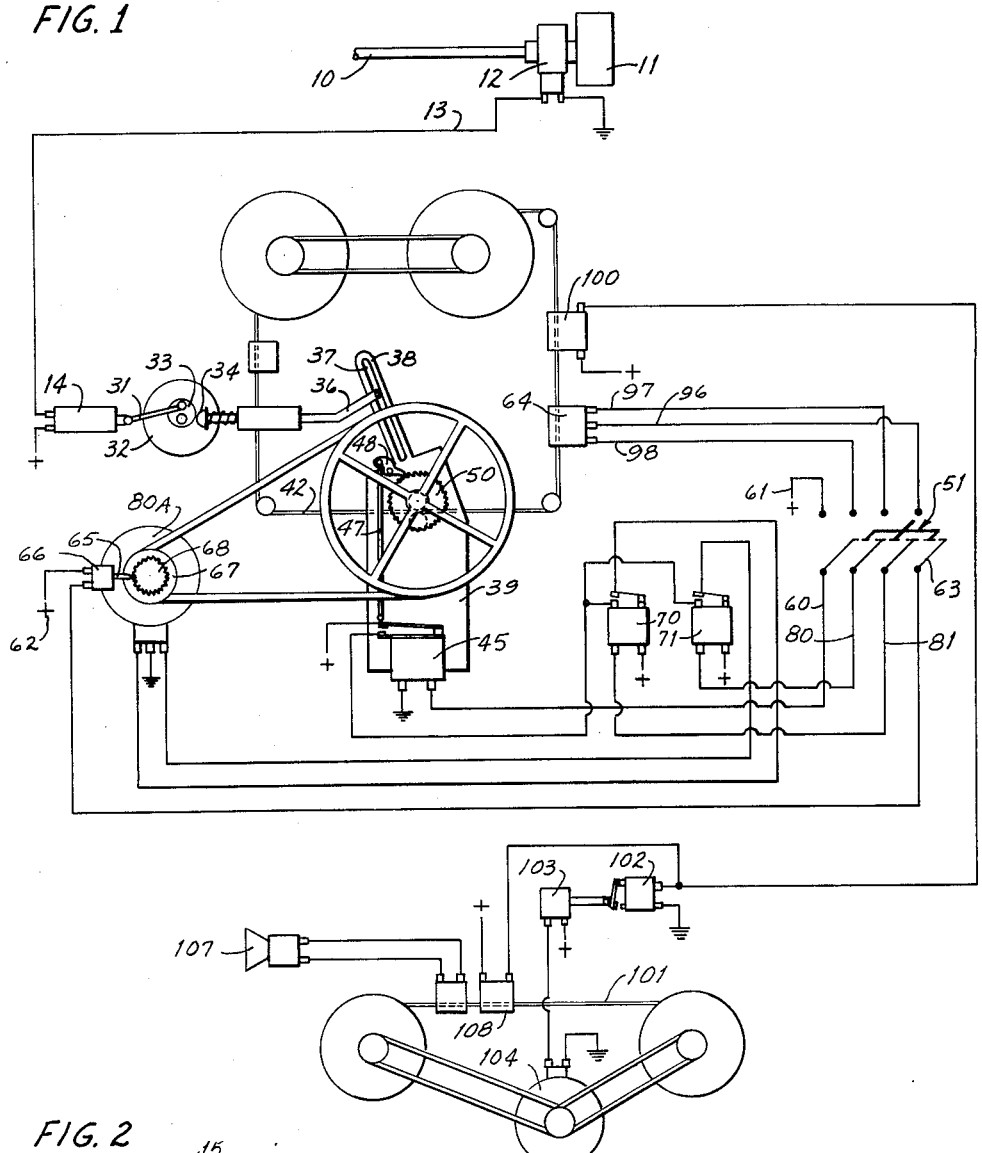

Referring more particularly to FIGURE 1 of the drawings, numeral 10 indicates a speedometer cable, or equivalent drive mechanism operated in synchronism with the speed of the motor vehicle. In this connection, it may be readily understood that while a conventional speedometer cable may be one means of securing a controlling drive for the feed of the map strip, or the equivalent, such drive may be arranged from the clutch, drive shaft or differential of the vehicle, which in some instances may be more accurate reflection of the vehicle's travel. Thus, the invention is not limited or confined to a conventional type of speedometer cable, which is here shown by way of illustration, or to any of several available drive connections. As indicated at 11 the speedometer cable may also drive a conventional speed indicator to provide visual illustration of the speed of the vehicle.

Figure 2:
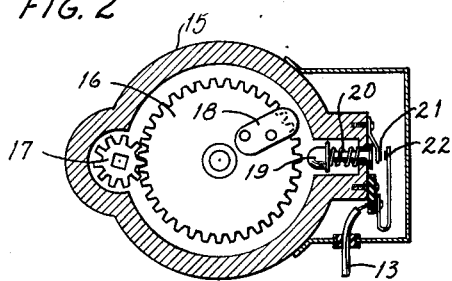

By operation of the speedometer cable through the mechanism illustrated in FIGURE 2, electrical energizing pulsations are delivered from an adapter 12 to a conductor 13 and thence to solenoid 14. As more clearly illustrated in FIGURE 2, the adapter includes a circular casing 15 mounting a central gear 16 that is rotated by and with the movements of the vehicle through a drive gear 17 rotated from the speedometer cable 10 or its equivalent. On the gear wheel 16 there is mounted a projecting detent 18. As the gear 16 rotates the detent 18 strikes a spring urged circuit control plunger 19 moving it outwardly against the tension of its springs 20 to cause periodic passage of current between contact elements 21 and 22 thus periodically energizing the solenoid 14 once in each revolution of the gear 16.

As the solenoid 14 is operated from the adapter 12 in the manner referred to, its armature 30 (see FIGURE 3) through link 31 will produce a periodic oscillation of wheel 32 upon which is mounted the eccentrically disposed cam 33. Such oscillations impart reciprocation to a plunger 34, thence to connector 35 and drive arm 36. It will be noted from FIGURE 3 that the opposite end connection with the arm 36 is by means of recessors 37 of an arm 38 which may adjustably receive the link 36 so as to very the effective stroke of the arm 38.

In the detailed showing of FIGURE 3, the arm and associated connected mechanism is shown in reverse from that illustrated in FIGURE 1. The arm 38 projects from an operating block 39 which in turn is rotatably mounted on a central shaft 40. Fixed to the shaft 40 there is mounted on upper map feed roller 41 for operating in frictional contact with the map tape 42 which in turn is trained over a companion roller 43 and fed by step by step movement of the upper roller 41.

Since it is not always desirable to feed tape in accordance with energization of the solenoid 14 by way of the adapter 12, particularly where tape stoppage, reversal or overrun is desirable for synchronization, as hereinafter described, the block 39 is provided with a relay 45 energization of which moves its arm 46 to impart downward movement to a link 47, hence swinging the ratchet dog 48 out of contact with the teeth 49 of a drive wheel 50 fixed to the shaft 40. If, for instance, a free travel of the vehicle without feeding of the map tape is desired, as in event of a detour from the given path of travel, the relay 45 may be energized to lift the ratchet dog 48 from the teeth of the wheel 49.

Such control of the relay 45 is accomplished by contacting the four-pole switch, generally indicated at 51. When the switch makes contact, energy is applied through the inner pole 60 from the source of power 61 at the relay 45. At the same time a motor over run brake may be applied by energization from its source of power 62 through the outer pole 63 and under control of the triple relay 64. The over run brake includes a plunger 65 of the relay 66 such as to engage the teeth of over run motor pulley 68, thus holding the drive wheel 67 in position.

The triple relay 64 is under control of the reset mechanism of FIGURE 6 hereinafter discussed. Under its control the triple relay 64 may supply energy through the second pole 80 or the third pole 81 of the four-pole switch which through the forward and reverse relays 70 and 71 respectively connect through the other side of the relay 45.

Forward or reverse adjustment for the map tape is provided by the control of triple relay 64 by the mechanism of FIGURE 6 in which the tape is indicated by the numeral 42 which is notched at 91 for registration with contact fingers 92. Fingers 92 bear at the outer ends against buss bars 93 and 94 on either side of a mid position. A central contact finger 95 engages a central conductor 96. Forward contact plate 93 is connected with a conductor 97 while the opposite reverse plate 94 is connected with a conductor 98. The mid portion of all contact fingers are grounded to plate 99. This arrangement is such that when the tape is in the central position electrical contact is provided through the conductor 96. If the tape has not reached the contact 95, the drive will be speeded up through contact of the fingers 92 with the conducting bar 94. If, however, the tape is too far in advance then contact will be established through conductor 97 to reverse the motor 80A associated with the over run brake. When the notch is in the central position normal operation will be established.

In a similar manner, a relay 100 is provided for control of the energization of the speaker tape 101 by a notch in the tape providing for the completion of the circuit to switch relay 102 for operating on and off relay 103 controlling drive motor 104 for moving the sound tape for energizing the speaker 107. A manual switch 108 may control the sound mechanism independently of the tape control above outlined. Details of the sound mechanism are substantially conventional and being well known to those versed in the art, need not be further described herein.

It will, of course, be understood that in the adjustment of the tape by the mechanism referred to, fixed positions along the highway will be utilized to coordinate the tape as to the vehicle's position, thus indicators may be erected, or fixed locations such as city limit posts or the like, may be utilized to zero the tape notch through the use of the above mechanism.

From the foregoing, it will be seen that the present invention provides a novel and simple means for providing a visual travel guide, and a means for successively feeding areas thereof to a vehicle operator while at the same time, under the control of the operator, audible information, instruction or entertainment may be provided. The invention further provides for the synchronism of the display of the visual guide means with the rendering of the audible recorded material. The apparatus provides both forward and reverse compensating means for maintaining synchronism as well as map controlled means for initiating and terminating the operation of the audible means. Further, the apparatus provides novel and unique means for control of a map tape from a speedometer or other source of vehicle movement detection. In the various features of the present construction, compensating and adjusting means are provided throughout.

It will be obvious that in carrying out the present invention, numerous changes, modifications, and the full use of equivalents may be resorted to without departure from the spirit or scope of the invention as outlined in the appended claims.

What I claim is:

1. In combination with an automotive vehicle, a map tape, mechanism for moving said map tape in accordance with travel distance of the vehicle for indication at a fixed position relative said tape the location of the vehicle along a pre-determined route displayed by said tape map, and means independent of said tape moving means for automatically moving said map tape forwardly or backwardly, selectively, to effect coordination thereoef at a predetermined location of the vehicle along the said route, said means for moving said tape forwardly or backwardly comprising an actuating device on said tape at a particular position therealong corresponding to said predetermined location, a reversible motor for said map tape, and means controlled by said actuating device for energizing said reversible motor to drive said tape in one direction or the other, selectively.

2. The invention as defined in claim 1 including a sound record tape, and means for moving said sound record tape in synchronism with said map tape.

3. The invention as defined in claim 1 wherein said means for moving said tape forwardly or backwardly further comprises two sets of switch means disposed immediately successively along said tape for control by said actuating means, an energization circuit for said drive motor and including said switch sets for turning said drive motor in one direction when one of said switch sets is controlled by said actuating means, and for turning said drive motor in the other direction when the other of said switch sets is controlled, said directions of movement of said map tape as so controlled being such that said actuating means is moved from one toward the other of said pair of switch sets.

References Cited by the Examiner

UNITED STATES PATENTS

| | | | |
|---|---|---|---|
| 972,397 | 10/10 | McGee | 40—28.1 |
| 1,358,085 | 11/20 | Lewis | 40—28.1 |
| 2,501,048 | 3/50 | Haller | 179—100.1 |
| 2,635,372 | 4/53 | Field | 40—42 |
| 2,928,186 | 3/60 | Hirsch | 179—100.1 |
| 2,965,720 | 12/60 | Bumstead et al. | 179—100.1 |

EUGENE R. CAPOZIO, *Primary Examiner.*

JOHN P. WILDMAN, JEROME SCHNALL, *Examiners.*